June 10, 1941.  R. T. CAMERON  2,245,182
COFFEEPOT
Filed June 4, 1940

Inventor,
Robert T. Cameron
By
Attorney

Patented June 10, 1941

2,245,182

UNITED STATES PATENT OFFICE 2,245,182

COFFEEPOT

Robert T. Cameron, Chattanooga, Tenn.

Application June 4, 1940, Serial No. 338,816

4 Claims. (Cl. 53—3)

The present invention relates to apparatus for brewing coffee in the manner known as French or "drip" coffee. The present invention is chiefly concerned in the provision of an apparatus or device whereby the leaching water may be passed through the ground coffee a number of times by inverting the device and can be poured off after each filtration to suit the tastes of different individuals.

Another object of the present invention is the provision of a coffee brewing device as above mentioned which, after each filtration or leaching operation the apparatus, may be placed over a heating element to warm the brew and is provided with means to permit the escape of steam and vapors but which will seal or close the apparatus in such manner as will prevent its contents from spilling or flowing out when the apparatus is inverted or reversed to its several positions.

Another feature of the invention is the provision of a coffee brewing device of the above stated character having very simple and practical features of construction which can be readily assembled or disassembled, even at a dining table without confusion or difficulty, the apparatus chiefly consisting of two similar vessels of any suitable material and of coffee pot or pitcher formation releasably connected together by a coffee containing cartridge, which latter is likewise readily removable.

With the above general objects of the invention stated, other objects and features of the invention will appear as the specification proceeds and will be particularly pointed out in the appended claims.

In the drawing, which shows the preferred embodiments of the invention as at present devised;

Figure 1:
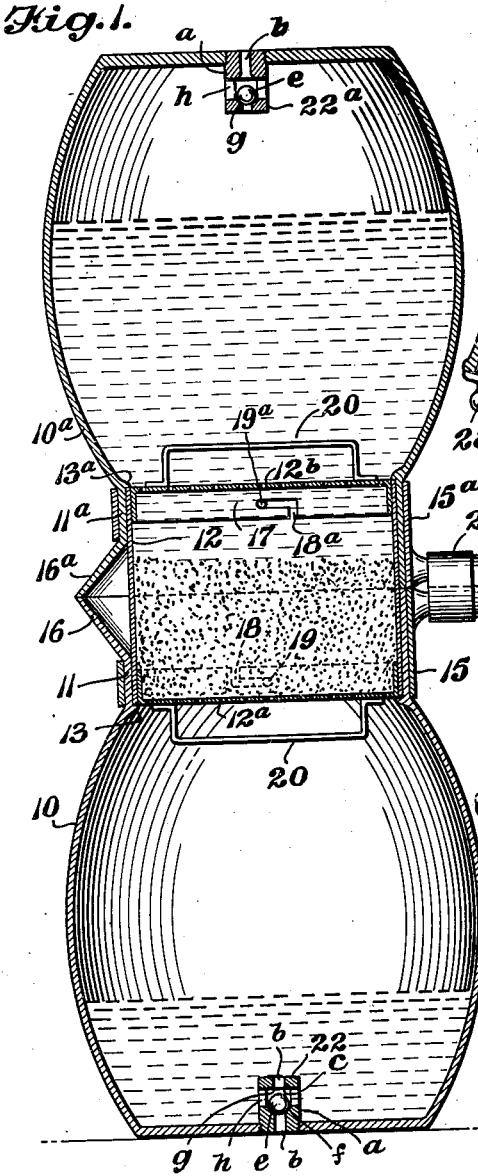
Figure 1 is a vertical sectional view through the coffee making apparatus constructed in accordance with one form of the invention.

Concerning the embodiment of the invention shown in Figure 1, the coffee brewing device consists of two pitcher-like receptacles 10 and 10a, preferably of similar or identical construction, one placed upon the other in inverted position and each having a reduced neck portion 11 and 11a into which will frictionally fit the sleeve 12, which forms the side walls of a coffee containing compartment. Stops 13 may be provided on the inner end of the reduced neck portions 11 and 11a against which the adjacent ends of the coffee containing receptacle 12 may abut. Each neck portion is preferably of the same dimension so that they may be brought into contacting engagement as shown when the vessels are in assembled position. Also each of the pitchers or vessels 10 and 10a are provided with a handle 14 and 14a at their neck portions, and are so arranged and disposed that when the vessels 10 and 10a are connected together and in the positions shown in Figure 1, these handles 14 and 14a will be in juxta associated position and provide a single handle for the assembled device for its easy manipulation. The handles 14 and 14a may be attached to the vessels in any suitable manner but are here shown as being secured to bands 15 and 15a which embrace the neck portions 11 and 11a, respectively.

In order to provide for easy pouring of the brewed product, each of the vessels 10 and 10a have their material deformed to provide lips 16 and 16a, these pouring lips being closed, when the vessels are in their assembled positions, as shown in the drawing, by the sleeve 12 of the coffee container.

The coffee container is completed by foraminated end members 12a and 12b disposed across the ends respectively of the sleeve 12. These members 12a and 12b may be strainers of any suitable type (either wire mesh or perforated plates) for permitting the filtration of the leaching water therethrough while retaining the coffee grounds in the coffee container. It is also proposed that the size of the openings in the foraminated member may be of such size as desired for any particular grind of the coffee and it is proposed to furnish several of these members of different sized openings with each brewing apparatus. These foraminated members are preferably detachably secured to the sleeve member 12 and to this end, in the form shown in the drawing, each is provided with an annular flange 17 dimensioned to frictionally fit the interior end portions of the sleeve and may be additionally provided with bayonet slots 18 and 18a to receive a suitable projection or indentation 19 and 19a on the sleeve 12. Also bale handle members 20 and 20a are provided on the foraminated members, by which the coffee container may be inserted and removed from position as well as enabling ready separation of the foraminated members from the sleeve 12. In order to insure against accidental separation of the vessels 10 and 10a during use, a suitable fastening means may be provided and in the present instance is shown as consisting of a slip ring 21 which will slidably and fittedly embrace the handle portions 14 and 14a when brought together as shown in Figure 1.

In order to permit the satisfactory operation of the device under all conditions the vessels 10 and 10a are each provided, preferably in the bottoms thereof, with a valve device 22 and 22a, respectively. These valves are in the form of check valves disposed within their respective vessels and each comprises a casing *a* having a through passage *b* therein extending from opposite sides of a valve chamber *c*, the passage *b* opening into the interior of the vessel and exteriorally thereof. A ball valve *e* is disposed in the valve chamber *c* and is designed to seat upon the valve seats *f* and *g* according to the position of the brewing apparatus. Laterally extending from the valve chamber *c* and inwardly of the seat *f* are lateral passages *h*. Thus, it will be seen that when the vessel 10 of the brewing device is lowermost the ball valve *e* of the valve device 22 will be seated upon its seat *f* and prevent the passage of liquid therefrom and the ball valve *e* of valve device 22*a* of the vessel 10*a* will be seated on its seat *g*, thus opening the passage *b* to the lateral openings *h*, allowing steam and vapors, which may be produced during the heating of the brewed coffee, to escape. When the vessel 10*a* is reversed to lowermost position, the ball valves *e* of the valve devices 22 and 22*a* will assume reverse positions as will be clearly understood.

Figure 3:
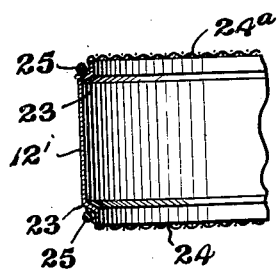
Figure 3 is a sectional view of a modified form of the coffee container.

As shown in Figure 3, when it is desired to use filter cloths instead of the foraminated members 12*a* and 12*b* the sleeve member 12' (corresponding to the sleeve member 12 in Figure 1) may have its inner ends off-set inwardly to form shoulders 23 so that the cloths 24 and 24*a* may be stretched over the ends and about the shoulders, a clamping wire or band 25 slipped over the off-set ends to bind the cloth in place.

Figure 2:
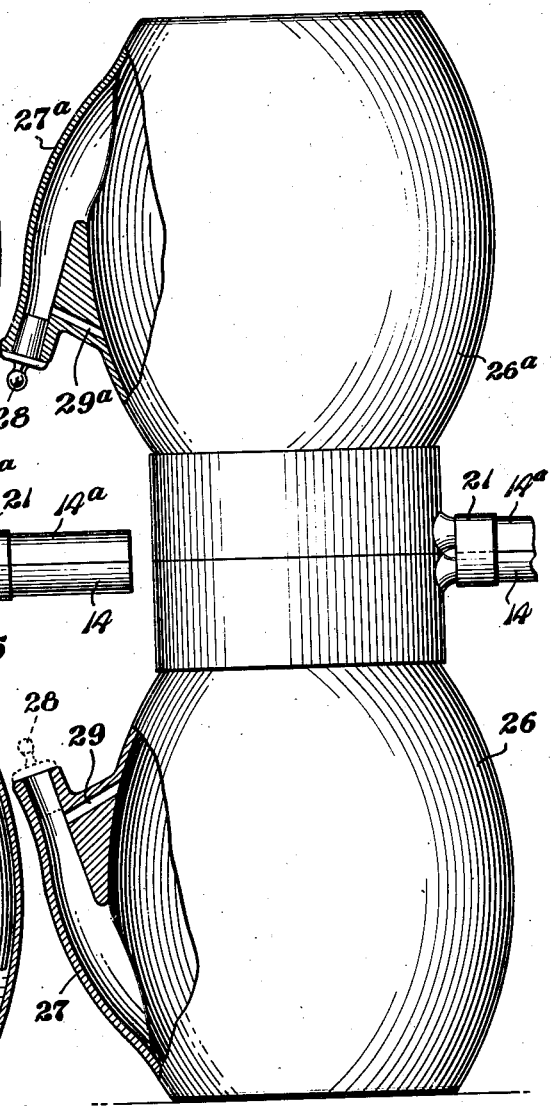
Figure 2 is a side elevation of the coffee apparatus constructed in accordance with another form of the invention with parts broken away to illustrate construction.

In Figure 2 a modified form of the invention is shown, which modification resides in both of the vessels 26 and 26*a* (corresponding respectively to the vessels 10 and 10*a*) being provided with pouring spouts 27 and 27*a* beyond the position of the coffee container. In this form of the invention the valve devices 22 and 22*a* are not necessary but, in their stead, is provided a stopper 28 which may be alternately fitted into the ends of the spout 27 or 27*a* during the reversing manipulation of the brewing device. For instance, assuming that coffee has been placed in the coffee container and water in the then lowermost vessel 26*a*, the stopper 28 is inserted in the end of the spout 27*a*. The brewing device is then inverted to place the vessel 26*a* uppermost and the vessel 26 lowermost, as shown in the drawing. After the water passes from vessel 26*a* to the vessel 26, such portion of the brewed liquid as desired may be poured from the spout 27 of the vessel 26. However, should it be desired to pass the remainder of the brewed liquid through the coffee grounds in order to obtain a stronger brew, the stopper 28 is removed from the spout 27*a* of the vessel 26*a* and placed in the end of the spout 27 of the vessel 26. The brewing device is then inverted to place the vessel 26*a* lowermost.

Drain conduits 29 and 29*a* are provided between the spout and the interior of their respective vessels so that any liquid remaining in the spouts when in inverted position will drain into their vessels, thus avoiding any dripping of the liquid when the stopper 28 is removed from a vessel in inverted position. It is also obvious that if the liquid is to be heated in the form of the device shown in Figure 2, the valves 22 and 22*a* do not have to be provided as the steam and vapors will pass through the open spout 27 or 27*a*. In all other respects the form of the invention shown in Figure 2 is the same as shown in Figure 1 and bears like numerals and references.

Having thus decribed the invention and the form in which it is at present preferred, it is to be understood that the invention is only to be limited by the scope of the appended claims.

What is claimed is:

1. In an invertible drip coffee brewing apparatus for obtaining one or more leachings of the ground coffee, two similar and separable vessels each having an opened end, a coffee container having foraminated ends and having opposite end portions detachably and fittedly inserted into the opened ends of said vessels, respectively, and connecting the latter together with one above the other and in inverted position, the open ends of said vessels having the openings therein formed and dimensioned to slidably and frictionally receive therein opposite ends of the coffee container, respectively, and pouring means formed at the open end portions of each vessel and closed by the coffee container when in assembled position.

2. In an invertible drip coffee brewing apparatus for obtaining one or more leachings of the ground coffee, two similar and separable vessels each having an opened end, a coffee container having foraminated ends and having opposite end portions detachably inserted into the opened ends of said vessels, respectively, and telescopingly connecting the latter together with one above the other and in inverted position, each vessel having at its opened end portion a laterally extending handle with a flat side and arranged to cooperate, when the vessels are connected together, to lie in juxtaposition with their flat sides contiguous to form a single handle to be grasped for the apparatus.

3. In an invertible drip coffee brewing apparatus for obtaining one or more leachings of the ground coffee, two similar and separable vessels each having an opened end, a coffee container having foraminated ends and having opposite end portions detachably inserted into the opened ends of said vessels, respectively, and telescopingly connecting the latter together with one above the other and in inverted position, each vessel having at its opened end portion a laterally extending handle with a flat side and arranged to cooperate, when the vessels are connected together, to lie in juxtaposition with their flat sides contiguous to form a single handle to be grasped for the apparatus, and means for fastening said handle together to prevent separation of the vessels.

4. In an invertible drip coffee brewing apparatus for obtaining one or more leachings of the ground coffee, two similar and separable vessels each having an opened end, a coffee container having foraminated ends and having opposite end portions detachably and fittedly inserted into the opened ends of said vessels, respectively, and connecting the latter together with one above the other and in inverted position the open ends of said vessels having the openings therein formed and dimensioned to slidably and frictionally receive opposite ends of the coffee container therein, respectively, and allowing said ends of said vessels to be brought into contacting engagement for enclosing the coffee container, a pouring lip formed at an edge portion of the opened end of each vessel and closed by the coffee container when in assembled position.

ROBERT T. CAMERON.